United States Patent [19]

Gortsema et al.

[11] Patent Number: 5,047,139

[45] Date of Patent: Sep. 10, 1991

[54] CATALYST FOR MID-BARREL HYDROCRACKING AND PROCESS USING SAME

[75] Inventors: Frank P. Gortsema, Pleasantville; Regis J. Pellet, Croton on the Hudson; Albert R. Springer, Mt. Vernon; Jule A. Rabo, Armonk, all of N.Y.

[73] Assignee: UOP, Des Plaines, Ill.

[21] Appl. No.: 453,879

[22] Filed: Dec. 20, 1989

Related U.S. Application Data

[63] Continuation of Ser. No. 130,559, Dec. 8, 1987, abandoned.

[51] Int. Cl.$^5$ ............................................. C10G 47/20
[52] U.S. Cl. ...................................... 208/111; 502/79; 502/85
[58] Field of Search ...................... 208/111; 502/79, 85

[56] References Cited

U.S. PATENT DOCUMENTS

| | | | |
|---|---|---|---|
| 4,120,825 | 10/1978 | Ward | 208/111 |
| 4,401,556 | 8/1983 | Bezman et al. | 208/111 |
| 4,419,271 | 12/1983 | Ward | 502/65 |
| 4,512,961 | 4/1985 | Scherzer et al. | 502/79 |
| 4,563,434 | 1/1986 | Ward et al. | 502/66 |
| 4,576,711 | 3/1986 | Ward et al. | 208/111 |
| 4,594,146 | 6/1986 | Chester et al. | 208/111 |
| 4,610,973 | 9/1986 | Ward | 502/65 |
| 4,648,958 | 3/1987 | Ward | 208/59 |
| 4,664,776 | 5/1987 | Ward | 208/111 |
| 4,672,048 | 6/1987 | Ward | 502/66 |

FOREIGN PATENT DOCUMENTS

| | | | |
|---|---|---|---|
| 0095305 | 11/1983 | European Pat. Off. | 208/111 |
| 2114594 | 8/1983 | United Kingdom | 208/111 |

*Primary Examiner*—Anthony McFarlane
*Attorney, Agent, or Firm*—Thomas K. McBride; Richard G. Miller

[57] ABSTRACT

This invention pertains to a hydrocracking process for mid-distillate products and to hydrocracking catalysts having improved selectivity, activity and stability for use in the production of mid-distillate products from heavy gas oil feedstocks boiling above 700° F.

8 Claims, 1 Drawing Sheet

CATALYST FOR MID-BARREL HYDROCRACKING AND PROCESS USING SAME

This application is a continuation of prior U.S. application Ser. No. 130,559, filed Dec. 8, 1987, now abandoned.

FIELD OF THE INVENTION

This invention relates to a hydrocracking process for mid-distillate products and to hydrocracking catalysts having improved selectivity, activity and stability for use in the production of mid distillate products from heavy feedstocks boiling above 700° F..

BACKGROUND OF THE INVENTION

Catalytic mid-barrel hydrocracking is a petroleum refining process of increasing importance due to the increased demand for mid distillate fuels. Forecasts of consumer demand for refined products are predicting shifts from the gasoline range hydrocarbon fuels to heavier, higher boiling mixtures such as diesel, turbine and heavy diesel. In general, the process consists of converting heavy petroleum feedstocks boiling above 700° F., such as vacuum gas oil and residual feedstocks, to a lower boiling range. The favored product boiling range is 300°-700° F. turbine and diesel fuels. The catalysts used in these hydrocracking processes are dual functional types, consisting of a hydrogenation component such as a Group VIII noble metal or a combination of Group VIII (Ni,Co) and Group VIB (Mo, W) metals, in combination with a solid acid catalyst, such as the LZ-10 zeolite, amorphous silica-alumina gel, transition aluminas or aluminosilicates. The latter components act as acidic cracking catalysts and they may also act as support for the metal components.

Of the solid acid components, it is generally understood that aluminosilicate zeolites are the most active in the sense that they convert the highest fraction of feedstock to lower boiling products under comparable operating conditions. Activity however, is only one of three essential properties of a mid-barrel hydrocracking catalyst. The other two properties are selectivity to produce the desired products (i.e. turbine and/or diesel) exclusively, and stability which is a measure of the useful operating life of the catalyst. It has been found that the high activity of strong acid zeolite catalysts does not compensate for their poor selectivity for turbine and diesel oil, and accordingly no commercial mid-barrel catalyst utilizes strong acid zeolites as the principal acid cracking component. Instead this function is provided either by amorphous compositions such as silica-aluminas derived from silica-alumina gels or by the mild acid LZ-10 zeolite, UHP Y zeolite described in U.S. Pat. No. 4,401,556, which shows much higher selectivity and lower activity than strong acid zeolites.

The chemistry of gasoline and mid-barrel hydrocracking processes are significantly different. In gasoline hydrocracking multiple fragmentation of the feed molecules is required. In mid barrel hydrocracking on the other hand, the average feedstock molecule should be split only once and very near the center of the molecule in order to maximize the mid-barrel fraction, and thereby minimize the production of light hydrocarbons, such as $C_1-C_4$ and gasoline. The zeolite component of catalysts employed for gasoline hydrocracking are strong-acid zeolites, such as Y-82, ReY or LZ-210 zeolite. In the production of diesel and turbine fuels multiple chain branching and multiple cracking are undesirable, consequently, weak or mild acid catalysts are required which yield considerably less isomerization and less multiple fragmentation.

The principal prior art of which the applicants are aware is GB 2114594A, which was published on August 24, 1983, to Bradrick, which describes the use of acid leaching of Y, ultrastable Y, X, decationized Y, and their derivatives. The steaming causes substantial loss in crystallinity and forms cracks and fissures in the crystal. Aluminum is removed from the Y-zeolite framework lattice during this treatment. Consequently, the resulting dealuminated crystal framework lattice has a higher $SiO_2/Al_2O_3$ ratio and consequently a smaller crystal cell constant. The acid leaching step causes further substantial reduction in the lattice constance ($a_o$) as well as substantial reduction in zeolite crystallinity.

The starting material for the preparation of the catalyst base for the present invention is the LZ-10 (UHP-Y) decribed in U.S. Pat. No. 4,401,556. This Y product is prepared from ammonium exchanged Y by steaming, followed by a further ammonium exchange to remove residual soda and resteaming to achieve the requisite UHP-Y characteristics of having a $SiO_2/Al_2O_3$ molar ratio of from 4.5 to 35, the essential X-ray powder diffraction pattern of zeolite Y, an ion exchange capacity of not greater than 0.070, a unit cell dimension $a_o$ of from 24.20 to 24.45 A, a surface area of at least 350m$^2$/g(B-E-T), a sorptive capacity for water vapor at 25° C. and a p/p° value of 0.10 of less than 5.00 weight percent and a Residual Butanol Test value of not more than 0.40 weight percent.

In the treatment of the UHP-Y product in accord with the present invention by acid or other extracting agents to remove amorphous occluded debris formed during previous treatments, there is no significant change in lattice unit cell dimension, $a_o$, while there is a substantial increase in Y zeolite crystallinity and surface area in the treated product.

The dramatic difference in the x-ray crystallinity of the acid extracted product of this invention compared to the material prepared according to the teachings of Bradrick (GB 2114594A) is illustrated in FIG. 1. Whereas the preparation of acid extracted zeolites by the Bradrick method leads to products having an x-ray crystallinity significantly less than the starting material, the preparation of such acid extracted products according to the present invention leads to products having x-ray crystallinity significantly greater than the starting material over a wide range of $SiO_2/Al_2O_3$ ratios.

Under the conditions described in GB2114594A, the mid-barrel selectivity is in the range of 40 to 50% conversion per pass for products boiling below 700° F. Selectivity can be increased to levels in excess of 60% mid-distillate for products in boiling range 400°-700° F. at 50% conversion per pass.

In the process of the present invention, selectivity to mid-barrel products distilling in the boiling range of 300°-700° F. is in the range of from about 85 to 90% at feed conversion of 60% per pass.

GB 2114594A refers to $SiO_2/Al_2O_3$ ratios greater than 10, and gives data for materials with ratios as high as 100. In the procedure of the present invention much lower ratios are effective. $SiO_2/Al_2O_3$ ratios of 8 to 12 are shown to be more effective to produce mid-barrel products using the present procedures for synthesizing the catalyst than the much higher ratios described in the reference.

The reference describes a process in which the $a_o$ of the treated Y zeolite decreases in a regular fashion with increasing HCl/zeolite concentration (See FIG. 2 thereof). In the presently described process there is very little, or no, change in the cell constant with acid concentration or number of acid treatments.

SUMMARY OF THE INVENTION

The present invention is directed to a hydrocracking process specifically applicable to the production of mid-distillate products including turbine and diesel oil from heavy feedstocks boiling above 700° F., said process comprising the use of a product derived from LZ-10 (UHP Y) zeolite which has been prepared in accordance with the teachings of this invention, as well as to hydrocracking catalysts incorporating such LZ-10 zeolite derivatives.

DESCRIPTION OF THE DRAWINGS

The sole FIGURE of the drawing is a plot showing the X-ray crystallinity at various $SiO_2/Al_2O_3$ ratios of zeolite compositions used in the process of the present invention compared with that of prior known zeolites used in similar processes.

DESCRIPTION OF THE INVENTION

Figure 1:
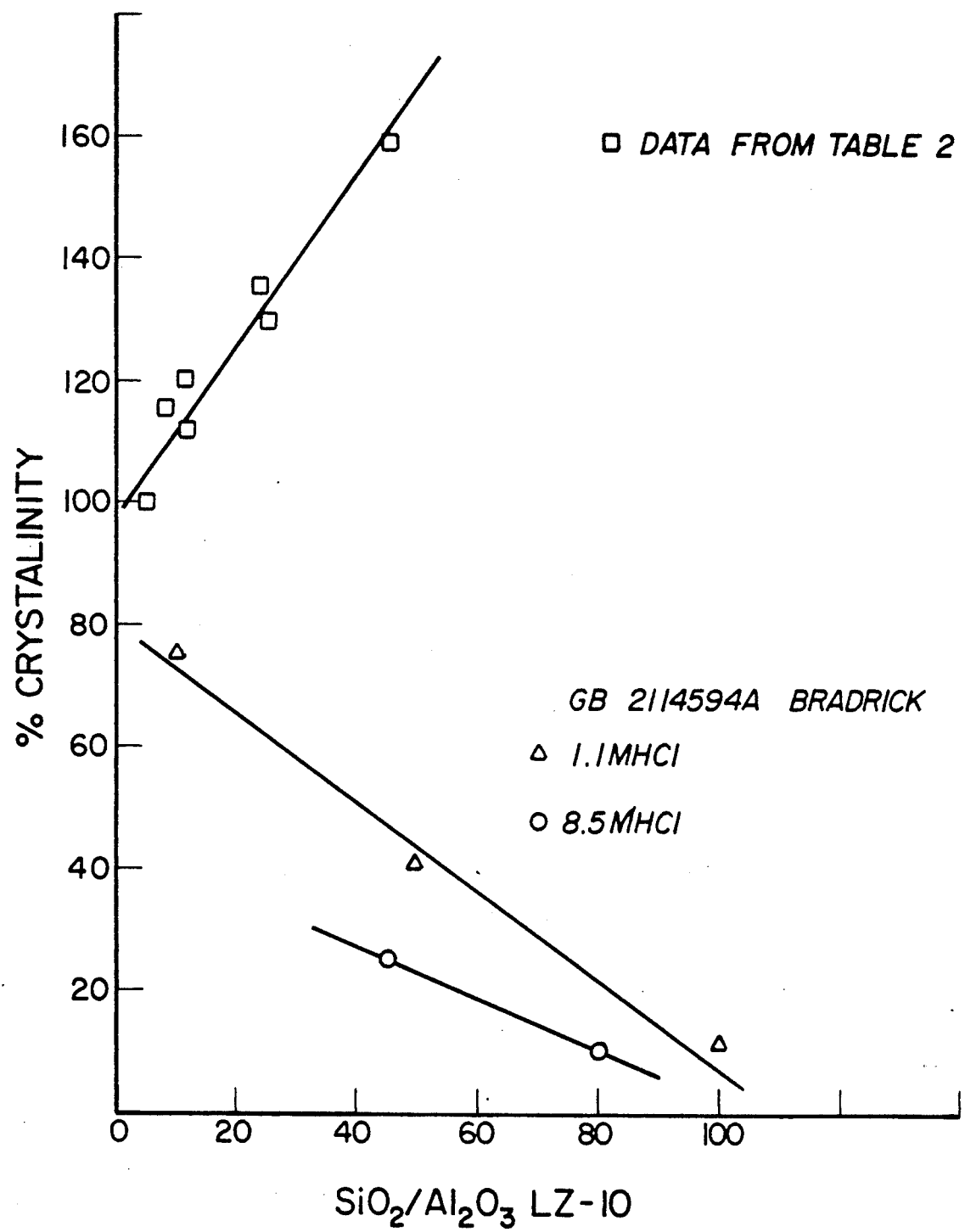

It has been found that a particularly advantageous catalyst for mid-barrel hydrocracking involves an alumina bound catalyst containing a commercially obtained silica-alumina and a selectively- acid extracted zeolite derived from LZ-10. The LZ-10 itself is a hydrophobic derivative of ammonium exchanged Y obtained by repeated steaming and further $NH_4^+$ exchange of the zeolite. A full description of the use of LZ-10 in mid-barrel catalyst applications is given in U.S. Pat. No. 4,401,556, the teachings of which are incorporated herein by reference. In the present invention the improvement resides in a novel treatment of the LZ-10 catalyst component.

According to the present invention the improved catalyst employs an LZ-10 product treated by acid or other agents to remove part of the occluded amorphous intra-crystalline material in place of the LZ-10 itself in the hydrocracking catalyst composition. The use of this material in combination with suitable matrix components such as alumina, silica-alumina, or the like and suitable hydrogenation components results in a catalyst with superior diesel, turbine, and heavy diesel selectivities. In addition, surprisingly, the acid extracted LZ-10 based catalysts show significantly higher catalytic activity.

The improvement afforded by the use of this new catalyst is illustrated by the data presented in Table 1. The catalysts of the present invention are shown to be 5°–10° F. more active than the reference catalyst which contains LZ-10 itself without selective extraction. In addition, the new, improved catalyst gives 3.8% more diesel, 4.8% higher turbine and 1.8% more heavy diesel fractions, all measured at 60% conversion of the feedstock. Superior activity for a mid barrel hydrocracking catalyst usually implies longer operating lifetime, and thus, better catalyst utilization before catalyst change-out is required because of the temperature limitations of the high pressure equipment. The higher selectivity to the desired mid-barrel products demonstrated by the hydrocracking catalysts comprising the acid extracted LZ-10 zeolite of the present invention therefore is of great economic benefit to the refinery. Higher activity and lower operating temperatures are desirable because they favorably affect both turbine and diesel oil quality-by keeping the aromatic contents at low levels.

The reason for the superior operation of the presently described catalyst is not completely known, however it is assumed to result from the selective removal of part of the amorphous acidic, alumina and/or silica containing, debris from the crystalline zeolite lattice, which debris is formed during the repeated steaming steps. During steaming, substantial amounts of alumina and some silica from the zeolite becomes dislodged from the lattice. This step is followed by silicon reinsertion, "healing" the crystalline lattice, so that during the steaming step there is a limited loss in zeolite crystallinity. Since the alumina and silica containing debris occluded in the crystal may act as acidic material, it presumably may cause undesirable over-cracking.

The removal of amorphous alumina and/or silica containing debris can be carried out effectively by treating the LZ-10 zeolite with agents that dissolve it or complex with it. One such class of materials which has been found to be useful in carrying out the selective extraction of the LZ-10 according to the present invention is treatment with various mineral acids, such as hydrochloric or nitric acids. During a reflux treatment with a mineral acid, a fraction of the amorphous occluded alumina and silica, which are not part of the zeolite lattice, is removed. Factors which influence the degree to which the alumina and silica can be removed from the zeolite are: strength and type of acid, time of extraction, temperature at which the extraction is carried out and the number of times the process is repeated. According to the present invention, in this process the degree of crystallinity of the material increases, and in preferred cases the increase in crystallinity can be very significant.

It is also contemplated that the method of the present invention can also be effectively carried out by the use of other known extraction methods involving the use of known extraction agents which do not degrade the crystallinity of the zeolite, such as organic acids, EDTA, acetyl acetone or other suitable chelating agents.

Properties of the acid extracted LZ-10 zeolite material according to the present invention are given in. Tables 1 and 2, for cell constant, degree of crystallinity, chemical composition and mid-barrel hydrocracking performance. It should be noted from these data that, while there is little or no change in the crystal unit cell constant, the surface area and crystallinity are higher and the catalytic activity and selectivity are significantly higher relative to the catalyst -prepared with the untreated material. The crystallinity values versus the $SiO_2/Al_2O_3$ ratio of the acid-extracted compositions of samples 4, 5, 6 7, 8, 10 and 13 of Table 2, infra, are shown in the plot of FIG. 1. It is apparent from the increase in crystallinity with increasing $SiO_2/Al_2O_3$ ratio that the acid extraction removes principally non-framework aluminum from these LZ-10 compositions. It is also apparent that the acid extracted compositions of the steamed $NH_4$-Y compositions of the prior art as represented by the GB 2114594A publication undergo significant framework dealumination, as evidenced by the decrease in crystallinity with increasing $SiO_2/Al_2O_3$ ratio. The plotted data from GB 2114594A are calculated in the routine manner from the combined data of FIG. 2 and FIG. 3 of that publication. The use of acid extracted LZ-10 as a component in the mid-barrel catalyst as described in the Examples leads to catalysts having very high diesel selectivity of up to about 88% and turbine selectivity of up to about 82%, with very high catalytic activity. These mid-barrel selectivities together with the improved activity and enhanced zeolite crystallinity render the catalysts of this invention far superior to state of the art type LZ-10 based catalysts, and far superior to the catalysts described by Bradrick.

TABLE 1

Comparison of Mid-Barrel Hydrocracking Performance

| Example No. | Composition | Zeolite $SiO_2/Al_2O_3$ | ACTIVITY T, °F. | % DIESEL EFF. 300–700° F. | % TURBINE EFF. 300–550° F. |
|---|---|---|---|---|---|
| I | REFERENCE Catalyst | — | 758 | 82.9 | 76.0 |
| II | 7.1% HCl S.A.E. LZ-10 49.7% silica-alumina 14.2% alumina binder 7% NiO 22% $WO_3$ | 8.8 | 751 | 87.0 | 81.2 |
| III | 17.1% HCl S.A.E. LZ-10 49.7% silica-alumina 14.2% alumina binder 7% NiO 22% $WO_3$ | 11.3 | 748 | 86.7 | 80.8 |
| IV | 7.5% HCl A.E. LZ-10 49.5% KMD alumina 20% alumina binder 6% NiO 17% $WO_3$ | 61.3 | >>780 | | |

A.E. = acid extracted
S.A.E. = selective acid extracted

TABLE 2

COMPARISON OF PROPERTIES OF ACID EXTRACTED LZ-10 ZEOLITES

| Sample No. | Treatment[1] | Surface Area[3] $m^2/gm$ | $SiO_2/Al_2O_3$ | X-Ray Crystallinity[4] |
|---|---|---|---|---|
| 1 | LZ-10 starting material | 558 | 5.1 | 100 |
| 2 | HCl S.A.E.[2](1x) | | 8.0 | |
| 3 | HCl S.A.E.(2x) | | 8.8 | 115 |
| 4 | HCl S.A.E.(3x) | 663 | 11.3 | 120 |
| 5 | $HNO_3$ S.A.E.(1x) | | 12.3 | 111 |
| 6 | $HNO_3$ S.A.E.(2x) | | 24.9 | 129 |
| 7 | $HNO_3$ S.A.E.(1x) | | 24.0 | 135 |
| 8 | $HNO_3$ S.A.E.(1x) | 553 | 5.1 | 101 |
| 9 | $HNO_3$ S.A.E.(1x) | 578 | 5.3 | 98 |
| 10 | $HNO_3$ S.A.E.(1x) | 689 | 11.3 | 119 |
| 11 | $HNO_3$ S.A.E.(1x) | | 8.7 | 114 |
| 12 | $HNO_3$ S.A.E.(1x) | | 11.5 | 128 |
| 13 | HCl S.A.E.(1x) | | 43.8 | 160 |

[1]Selective acid extraction was carried out by varying extraction time, temperature and concentration of extraction agent used.
[2]S.A.E. - Selective acid extraction
[3]1-point BET method
[4]Relative to untreated LZ-10 starting material While the invention has been described above the details of the present invention will be better understood by recourse to the following examples:

EXAMPLES

GENERAL COMMENTS

Feedstock: All data reflected in the following Examples were obtained with HVGO feedstock with the following properties:
S Content: 24,500±400 ppm
N Content: 800±100 ppm
IBP: 700° F.
FBF: 1050° F.
Pourpoint: 95° F.
Sp. Gravity 0.9218, 60° F.

Testing Method

Catalyst Form: 1/16" extrudates, crushed and sized to 12x14 mesh diluted with 150 cc of 12x16 mesh quartz chips to give total volume of 300 cc. The quartz chip/catalyst mixture is loaded in a SS reactor as a plug between quartz chips (approximately 300 cc on bottom, 400 cc over the catalyst).

Activation Procedure: The system is purged with $N_2$ for 15 minutes at a flow rate of 5 $ft^3$/hr., followed by purging the system with $H_2$ for 15 minutes at 5 $ft^3$/hr.; the system is leak-checked under $H_2$ pressure. If the system has no leaks, the system is depressurized to atmospheric pressure and the $H_2$ flow rate is set to 2.65 SCF/hr. The $H_2S$ flow rate is adjusted to give a blend of 10% $H_2S$, 90% $H_2$ at ambient conditions and held at these conditions for 16 min. The temperature is then raised to 450° F. at a rate of 50° F./hr. and held at 450° F. for 2½ hrs. Then the temperature is ramped from 450° F. to 700° F. at 25° F./hr, and held for 2½ hrs., followed by rapid cooling to 490° F. At 490° F., the $H_2S$ blending into the $H_2$ stream is stopped and the system is pressurized to 2000 psig at a flow rate of 9.44 $ft^3$/hr at STP (10,000 SCF/BBL). The feed oil is started and adjusted to 1.0 LHSV (150 cc/hr). These conditions are maintained for 2½ hrs. to ensure complete wetting of the catalyst. The temperature is ramped at 50° F./hr. to the process conditions.

The temperature is varied at the standard process conditions to attain various conversion levels to bracket 60% conversion to diesel oil. Gas samples were taken during each mass balance period and analyzed for $H_2$ and $C_1$–$C_2$ gas components. The liquid product weight was measured and the specific gravity determined. Samples were taken at each set of conditions for simulated distillation G.C. analysis (ASTM Procedure No. D-2887) to determine the 300° F., 550° F., and 700° F. product cutpoints.

DEFINITIONS

ACTIVITY T is defined as the reaction temperature required to achieve 60% conversion to products boiling below 700° F.

% DIESEL EFF. is defined as selectivity to diesel oil at 60% conversion to diesel oil.

% TURBINE EFF. is defined as selectivity to turbine oil at 60% conversion to diesel oil.

EXAMPLE I

Preparation of reference catalyst

A catalyst blank was prepared according to the teachings of U.S. Pat. No. 4,419,271 having the following composition: 10% LZ-10, 20% Catapal alumina binder, and 70% silica-alumina, the latter having an overall composition of 55% $Al_2O_3$, 45% $SiO_2$ and a surface area of between 550 and 625 $m^2/g$ (3 point BET method). A description of the method of preparation of these $SiO_2$-$Al_2O_3$ materials is given in U.S. Pat. No. 4,097,365 and U.S. Pat. No. 4,419,271. These components were mulled and formed into 1/16" extrudates, dried at 100° C. and calcined at 500° C. using the following heating schedule:

Room temperature to 220° C. in 60 min.
Hold at 220° C. for 90 min.
220° to 500° C. in 60 min.
Hold at 500° C. for 120 min.
Cool down to 400° C., remove, bottle hot and seal airtight.

After determining the water pore volume of the calcined extrudates, the extrudates were pore filled with nickel and tungsten salts by preparing separate solutions of the proper concentration of nickel salt and tungsten using nickel nitrate hexahydrate and ammonium metatungstate. The two solutions were mixed and sufficient water added to the solution to bring the total solution volume up to the previously determined pore volume of the calcined extrudates. After complete solution uptake, the salt loaded extrudates were dried at 100° C. and calcined using the same previously described calcination schedule. The finished catalyst had the overall composition: 7.1% LZ-10, 49.7 silica-alumina, 1 4.2% alumina binder, 7% NiO, and 22% $WO_3$.

Hydrocracking tests of the reference catalyst yielded activity of 758° F. and diesel and turbine selectivities of 82.9 and 76.0 percents, respectively.

EXAMPLE II

Preparation of a catalyst containing HCl acid extracted LZ-10 with a $SiO_2/Al_2O_3 = 8.8$ A catalyst was prepared by acid washing LZ-10 (commercial product obtained from Union Carbide, Mobile, Alabama) with HCl, LZ-10, 100 gms, was slurried in 1 L of distilled water and enough concentrated Hcl added to bring the pH of the solution to 1.0. The temperature of the slurry was brought to 85° C. and held at 85° C. for 1 hour. After cooling, the slurry was filtered using a Buchner funnel and the resulting filter cake was thoroughly washed with distilled water following by drying at 100° C. Elemental analyses of this material indicated a $SiO_2/Al_2O_3$ of 8.0. The acid treatment procedure on the above material was repeated in its entirety a second time. Chemical analysis of the washed and dried product indicated a $SiO_2/Al_2O_3$ of 8.8.

A portion of the above hydrochloric acid twice extracted material was used to prepare a finished catalyst identical to that described in Example 1 in all repects, except for the substitution of the above described twice acid extracted LZ-10 for the LZ-10. The sample was prepared by mulling 105 gms of silica alumina (described in Example I) with 15 qms of HCl acid extracted LZ-10 in a laboratory size Hobart muller for 15 minutes. Peptized Catapal alumina, 30 gms, prepared by adding 4 ml of concentrated nitric acid and 75 ml of water, was added to the same muller and the mulling carried out for an additional 10 minutes. The mull mix was brought to the proper consistency by addition of water, if necessary, and extruded into 1/16" pellets, followed by drying at 100° C. and calcination to 500° C. using the heating schedule described in Example I.

The calcined extrudates were pore filled with nickel and tungsten. A nickel solution was prepared by dissolving 36.6 gms of $Ni(N_3)_2 \cdot 6 H_2O$ in 30 cc of water and 35.9 gms of ammonium metatungstate in 30 cc of water. The two solutions were mixed together and additional water added to bring the total solution volume to 65 cc. The mixed solution was added to 95.9 gms of extrudates and agitated. After complete solution uptake the extrudates were dried at 100° C. and calcined at 500° C. using the previously described heating schedule.

The composition of the finished catalyst was 7.1% HCl S.A.E. LZ-10; 49.7% silica-alumina; 14.2% alumina binder; 7% NiO, and 22% $WO_3$.

Hydrocracking tests of this catalyst showed that it is significantly more active, 751° F., and substantially more selective for the production of both diesel oil, 87.0%, and turbine oil, 81.2%, relative to the reference catalyst of Example I. This higher activity indicates longer catalyst life and better product quality while the diesel and turbine selectivities yield substantial direct economic benefits in product value.

EXAMPLE III

Preparation of a catalyst containing HCl acid extracted LZ-10 with a $SiO_2/Al_2O_3 = 11.3$.

Using the procedure described in Example II, acid extracted LZ-10 having a $SiO_2/Al_2O_3 = 11.3$ was prepared by carrying out the previously described acid leaching procedure a total of 3 times using HCl solution at pH = 1. Each reflux acid treatment was for a 1 hour contact period. For each acid treatment a fresh HCl solution was used. The resulting filter cake was thoroughly washed with distilled water and dried at 100° C. Chemical analysis of the three times acid extracted material showed a $SiO_2/Al_2O_3 = 11.3$.

A catalyst was prepared substituting the HCl acid extracted LZ-10 component having a $SiO_2/Al_2O_3$ ratio of 11.3 for the commercially available LZ-10 described in Example I. The catalyst was prepared by mulling 105 gms of silica alumina (described in Example I) with 15 gms of the above three times extracted LZ-10 in a laboratory muller for 10 minutes. Peptized Catapal alumina (30 gms), prepared by adding 4.0 ml of concentrated nitric acid and 75 ml. of water was added to the mull mix and the mulling carried Out for an additional 15 minutes. After the mix was adjusted to a suitable consistency with water, the mixture was extruded into 1/16" pellets, dried at 100° C. and calcined at 500° C. using the heating schedule described in Example I.

Metal addition was carried out by pore filling after determining the pore volume of the extrudates. A Ni(-$NO_3)_2$ solution was prepared by dissolving 47.5 gms of $Ni(NO_3)_2 \cdot 6H_2O$ in 30 cc of water and 46.6 gms of ammonium metatungstate in 30 cc of water. The two solutions were mixed and additional water added to bring the total solution volume to 80 cc. The mixed solution was added to the extrudates (135 gms) were added and agitated. After complete solution uptake the metal loaded extrudates were dried at 100° C. and calcined to 500° C. for 2 hrs using the same heating schedule given in Example I.

The composition of the finished catalyst was 7.1% HCl S.A.E. LZ-10, 49.7% silica-alumina, 14.2% alumina binder, 7% NiO, and 22% $WO_3$.

Hydrocracking tests of the catalyst showed that it is significantly more active, 748° F., and substantially more selective for the production of both diesel oil, 86.7%, and turbine oil, 80.8%, relative to the reference catalyst in Example I. The results are similar as those obtained with the catalyst shown in Example II. Both show substantial improvement over the prior art.

EXAMPLE IV

Preparation of a catalyst containing nitric acid extracted LZ-10 with a $SiO_2/Al_2O_3 = 11.3$ A catalyst was prepared using procedures similar to that described in Examples II and III except that nitric acid was used in place of HCl for the LZ-10 acid extraction step. A nitric acid solution was prepared by adding 120 cc of concentrated nitric acid to 10 l of distilled water in a 3 neck 12 l flask placed in a heating mantle. To the stirred nitric acid solution was added 1,000 gms (anhydrous equivalent) of LZ-10 and the slurry brought to reflux and held at reflux condition for 1 hour. The slurry was cooled, filtered using a Buchner filtering funnel and washed using 25 l of distilled water per kg zeolite and dried at 100° C. The chemical analysis of the acid extracted product gave a $SiO_2/Al_2O_3$ of 11.3.

The $HNO_3$ acid extracted component was incorporated into a finished catalyst using the same procedures as described in Examples II and III, substituting the $HNO_3$ acid extracted LZ-10 for the LZ-10 component.

The composition of the finished catalyst was 7.1% $HNO_3$ S.A.E. LZ-10, 49.7% silica-alumina, 14.2% alumina binder, 7% NiO and 22% $WO_3$.

EXAMPLE V

Preparation of a Catalyst containing HCl acid extracted LZ-10 $SiO_2/Al_2O_3 = 61.3$(Comparative)

A 2 kg batch of acid extracted LZ-10 was prepared using the following procedure. To a glass 22 l three neck flask containing a glass stirring apparatus and set in a heating mantle, was added 9.5 l of distilled water, 4.5 l of concentrated HCl and 2.275 kg of LZ-10. This mixture was stirred for 3 hours at reflux conditions, followed by cooling and allowing the suspended solid to settle. The supernatant liquid was decanted. Additional water was added to the remaining slurry, the mixture was agitated and then filtered. The filter cake was thoroughly washed with a pH=3 nitric acid solution until the filtrate was chloride free and then given a final wash with distilled water. The material was dried in an oven overnight at 100° C. Chemical analysis showed the acid extracted LZ-10 to have a $SiO_2/Al_2O_3 = 61.3$.

A catalyst was prepared using the above described acid extracted LZ-10 component employing, the following procedure. To a laboratory size muller was added 188 gm of acid washed LZ-10, 238 gms of $NiCO_3$, 521 gms of ammonium paramolybdate and 1,237 gms of Kaiser Medium Density (KMD) alumina. All weights quoted are anhydrous equivalents. The mulling was carried out for 20 minutes, 1 l of water was added to the dry mull and the mulling carried out for an additional 20 minutes. Catapal alumina was peptized by adding 70 cc of concentrated nitric acid to 2 l of distilled water and adding 500 gm (anhydrous) Catapal alumina. The peptized Catapal alumina was added to the mull mix and all components were mulled together for an additional 45 minutes. The mix was adjusted to an extrudable consistency by addition of water and the entire batch was extruded into 1/16" pellets which were air dried at 100° C. for 16 hours followed by calcination using the previously described heating schedule.

The composition of the finished catalyst was 7.5% HCl A.E. LZ-10, 49.5% KMD alumina, 20% alumina binder, 6% N.O., and 17 $WO_3$.

When tested for mid-barrel hydrocracking activity the catalyst was found to be inactive. The hydrocracking test was terminated after 40 hours duration since even at over 780° F. the product density API was only 35.2, as compared to a typical target API of 39.5-40.

While the invention has been described with respect to various specific Examples and embodiments, it is to be understood that the invention is not limited thereto and that it may be variously practiced within the scope of the following claims:

We claim:

1. A hydrocracking process for the production of mid-distillate product from heavy feedstocks boiling above 700° F. comprising treating said heavy feedstock at hydrocracking reaction conditions and in the presence of a hydrocracking catalyst comprising a selectively extracted LZ-10 zeolite wherein the LZ-10 zeolite has been selectively extracted to increase its initial $SiO_2/Al_2O_3$ molar ratio of about 5.0 to a higher value within the range of 7.0 to 60.0.

2. A hydrocracking process according to claim 1 wherein the selectively extracted LZ-10 zeolite has a $SiO_2/Al_2O_3$ ratio of from about 8 to 20.

3. A hydrocracking process according to claim 1 wherein the LZ-10 zeolite has been selectively acid extracted.

4. A hydrocracking process according to claim 3 wherein the LZ-10 zeolite has been selectively acid extracted utilizing a mineral acid.

5. A hydrocracking process according to claim 4 wherein the mineral acid utilized to selectively acid extract the LZ-10 zeolite is selected from the group comprising hydrochloric acid and nitric acid.

6. A hydrocracking process according to claim 1 wherein the heavy feedstock boiling above 700° F. is a high vacuum gas oil feedstock and the hydrocracking catalyst comprises the selectively extracted LZ-10 zeolite component in combination with at least one hydrogenation catalyst component.

7. A hydrocracking process according to claim 6 wherein the LZ-10 zeolite component of the hydrocracking catalyst is selectively acid extracted.

8. A hydrocracking process according to claim 7 wherein the LZ-10 zeolite component of the hydrocracking catalyst has a surface area and crystallinity exceeding that of the unextracted LZ-10 by at least 5% and the hydrogenation component is selected from the group consisting of cobalt, nickel, molybdenum and tungsten.

* * * * *